Sept. 8, 1931.  G. SACCO-ALBANESÉ  1,822,238
COFFEEPOT
Filed July 17, 1929   2 Sheets-Sheet 1

Inventor
Giuseppe Sacco-Albanesé
by Wilkinson & Giusta
Attorneys.

Sept. 8, 1931.  G. SACCO-ALBANESÉ  1,822,238
COFFEEPOT
Filed July 17, 1929   2 Sheets-Sheet 2
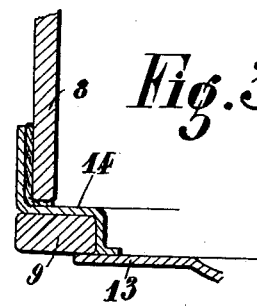
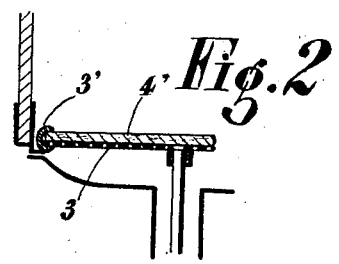
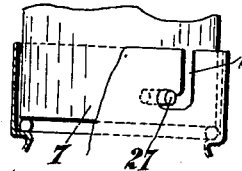
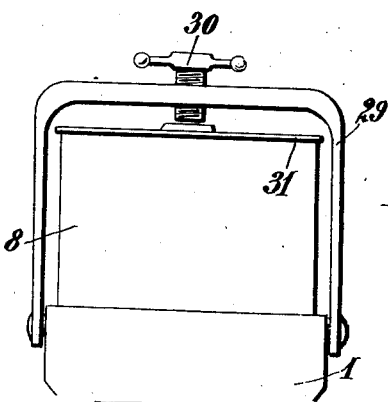
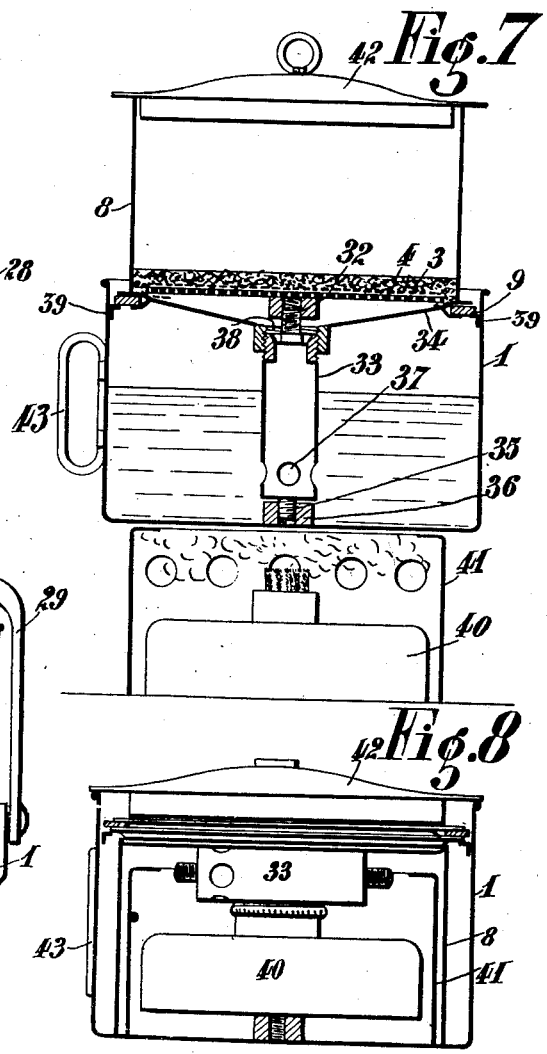
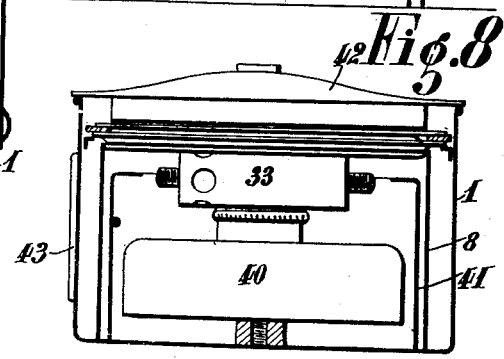
Inventor
Giuseppe Sacco-Albanesé
by Wilkinson & Giusta
Attorneys.

Patented Sept. 8, 1931

1,822,238

UNITED STATES PATENT OFFICE

GIUSEPPE SACCO ALBANESÉ, OF PARIS, FRANCE

COFFEEPOT

Application filed July 17, 1929, Serial No. 379,039, and in France August 9, 1928.

This invention relates to a coffee-pot for making Turkish coffee.

It is well known that the Turkish method is the one which enables the best results to be obtained with a given coffee.

According to this method of making coffee, the latter, after having been very finely ground, is poured into very hot water, with which it is rapidly mixed, and is then poured into a cup where it cools sufficiently to enable it to be drunk. With this method of preparation, all the essential ingredients of the coffee are brought out, in particular caffeine, to which the coffee owes the best of its flavour, and which is not driven off by the prolonged boiling. On the other hand, the water, whose temperature has approached without actually attaining 100° C., has not been able to dissolve the tannins which give a bitter flavour.

Said method however has the defect of leaving the grounds in the coffee, instead of filtering same, a process which would be very lengthy in the case of finely ground coffee. Several solutions have already been suggested to overcome this defect. Attempts were first made to use steam pressure to force the coffee rapidly through the filter; this method has the defect of raising the temperature above 100° C. in order to obtain the pressure of 2 or 3 kilos generally used. The caffeine is then destroyed and the tannin dissolved.

A better solution consists in producing a suction through the filter. The latter is used as a lid to close a receptacle containing the water which is heated almost to the boiling point. The greater part of the water is driven off by the steam and rises through the coffee placed on the filter; on allowing to cool, the condensation produces a relative vacuum capable of producing rapid filtration.

All the apparatus suggested heretofore, operating according to the above principle, have however the defect of being of a peculiar and not very ornamental shape. Moreover, they are difficult to clean when made of metal and are fragile when made of glass.

The coffee-pot according to the invention obviates the above drawbacks.

Said coffee pot is characterized by the fact that the filter is removable and is fixed on a receptacle by means of a clamping device which during the operation crushes a plastic packing forming a tight joint, while, after removing the filter, the receptacle which contains the coffee after the operation, can be used alone for pouring out.

According to the invention, the filter is removably fixed above a base extended by a tube projecting downwards into the lower receptacle and open at the bottom so as to allow the water in the receptacle, when heated, to rise up said tube to pass through the filter and reach the coffee placed on said filter.

The filter is fixed to its base by means of a rod secured to the filter which is clamped in the tube and the base is fixed to the receptacle by screwing the end of said rod into said receptacle, thereby causing a compressible joint to be crushed between the base and the receptacle whereby a tight joint is obtained.

According to another embodiment, the filter is fixed on its base by screwing into the tube secured to the base a rod the head of which rests on said filter, the tightening of the screw at the same time causing a bead carried by the edge of said base to be crushed against the wall of the receptacle, so as to provide a tight joint.

According to one embodiment, so designed that for travelling the members can be fitted one within the other, said tube screws into the base of the filter and carries a rod on which the filter proper is screwed, the other end of said tube screwing into the bottom of said receptacle by compressing a plastic joint between the base of said filter and said receptacle, the various parts being so proportioned that all the other members of the filter as well as a spirit lamp and the stand on which the receptacle is heated can be placed within said receptacle.

In the various cases described above, the base of the filter could be fixed in tight fitting manner in the receptacle by means of a bayonet joint.

Other advantages and peculiarities of the invention will be gathered from the following description taken with reference to the accompanying drawings of various embodiments of the invention.

In the drawings:

Figs. 2 and 3 show, by way of example, on a larger scale, details or modifications of construction.

Figs. 5 and 6 show, in a similar manner, on a larger scale, two modified embodiments.

Fig. 7 is a section, similar to that of Figs. 1 and 4, of a coffee-pot the members of which can be fitted one within the other for travelling.

Fig. 8 is a similar view in which the various members of the coffee-pot of Fig. 7 have been brought one within the other.

Figure 1:
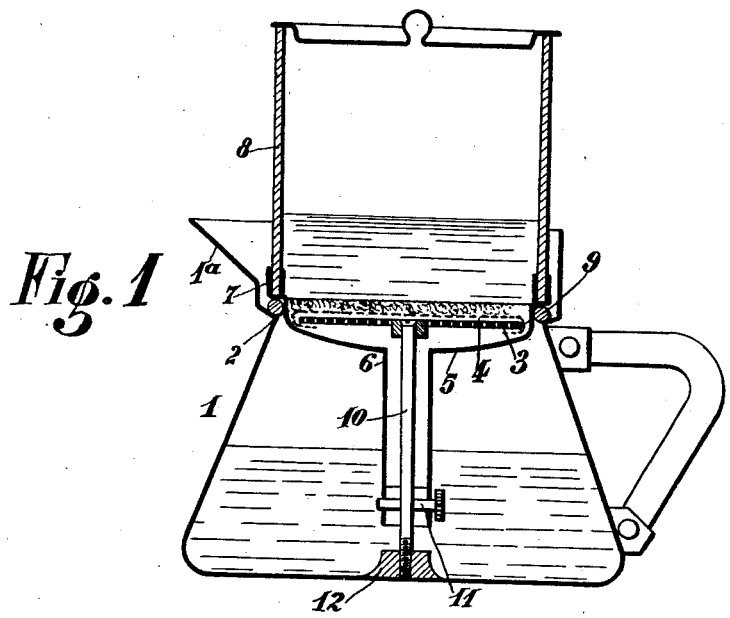
Fig. 1 is a vertical section through its median plane of a coffee-pot according to the invention.

In the device shown in Fig. 1, the receptacle 1, which has been previously filled with water and which will subsequently hold the coffee, is in the form of a Turkish coffee-pot. Said receptacle which acts as a pouring device may have any kind of outer ornamentation, it may be engraved, engine-turned, hammered, etc. Extending right round its circumference is a slight ledge 2 for receiving the filter and providing a tight joint. Said ledge 2 is placed below the lowest point of the pouring spout 1a. The filter-forming portion is composed of a filter proper 3, comprising a perforated metal plate over which is stretched a gauze 4 which may be made of vegetable, cotton, thread, or woolen fabric, or which may be a very fine metallic gauze.

Said gauze is folded over the edge of the plate 3 and is held between the latter and the base of the filter 5. Said base is extended at its lower end by a tube 6 open at its lower end and, at its upper end it is shaped like a circular channel 7 in which fits a glass cylinder 8. Between the channel-shaped part 7 and the ledge 2 of the receptacle, a plastic joint 9 is interposed. In its central portion, the metallic plate 3 carries a rod 10 by means of which the metal plate 3 may be fixed to the base 5. Said rod is held in the tube 6 by means of a cotter 11 extending through both the tube and the rod in cavities provided for this purpose in said two parts.

Moreover, the rod 10 has at its lower end a thread for screwing it into a lug 12 provided for this purpose at the bottom of the receptacle 1 and tapped on its inside. By screwing the rod 10, the whole assembly forming the filter proper, i. e. the tube 6, the base 5, etc., is clamped in the receptacle, the plastic joint 9 is crushed between the underside of the channel 7 and the ledge 2, and forms a tight joint.

The apparatus operates in the following manner: the gauze 4 is placed on the metallic plate 3 and said two parts are clamped to the base 5 by means of the bolt 11. After having filled the receptacle 1 with water, the rod 10 is screwed into the lug 12, crushing, as has been mentioned above, the joint 9 which forms a tight joint. A suitable quantity of finely ground coffee is then placed on the gauze 4 and the receptacle placed on the fire. Under the action of the heat, the steam produced forces the water up through the central tube 6, and it passes through the plate 3 and the gauze 4, lifting and moistening the coffee powder placed above. During the whole time the receptacle is on the fire, a certain quantity of water remains in the upper receptacle 8 soaking the coffee without being brought to the boiling point. As mentioned previously, the coffee is thus produced under the best conditions.

When the liquid has risen, it should be stirred round slightly with a spoon so as to ensure that it shall thoroughly moisten all the particles of the coffee powder.

When the coffee-pot is taken off the fire, the temperature falls, the steam condenses and the pressure decreases in the lower receptacle; the water which had risen above the coffee powder is sucked down through the latter and the drop in pressure is sufficient to produce a fairly strong suction which accelerates the passage of the water through the powder, which would otherwise proceed very slowly. If desired, the coffee-pot may be replaced on the fire, thus causing the water to rise again into the coffee powder. The operation may be repeated several times, which can not be done with an ordinary coffee-pot unless one takes the coffee which has already passed into an auxiliary receptacle and pours it again over the filter.

It is obvious that the device described herein enables the filter to be very easily cleaned since the various members may be separated one from the other, and, in particular, the metallic gauze on which the coffee powder lies may be removed for washing or changing same. The filter can therefore never spoil the taste of the coffee through invisible traces of mould, as very frequently happens in filters which are difficult to clean. The filter proper instead of being made of vegetable or metallic gauze, might equally well be made of a porous substance such as filtering porcelain or porous glass.

In the device of Fig. 2, said filter is supported in an identical manner to that of Fig. 1. In this case, a porous plate 4' is simply placed above the perforated plate 3; said plate 4' is fixed to the plate 3, either by soldering, or by means of a ring 3' of suitable shape and character. It will of course be understood, that any other fixing means might be employed; the advantage of said system of filter is that it can be sterilized by heat.

In Fig. 3 another embodiment is shown of the part of the filter which rests on the plastic joint to form a tight joint. In this case, 13 is the edge of the base of the filter; on said edge which may be stamped out, is soldered a ring 14, which is itself stamped out. The glass sleeve 8 is sealed in any known manner in the upturned edge of the ring 14. Between the ring 14 and the plate 13 is clamped the plastic material 9 forming a tight joint and which is crushed against the ledge 2 of the receptacle. The various members shown in Fig. 3 are of very simple construction and enable a very inexpensive coffee-pot to be obtained.

Figure 4:
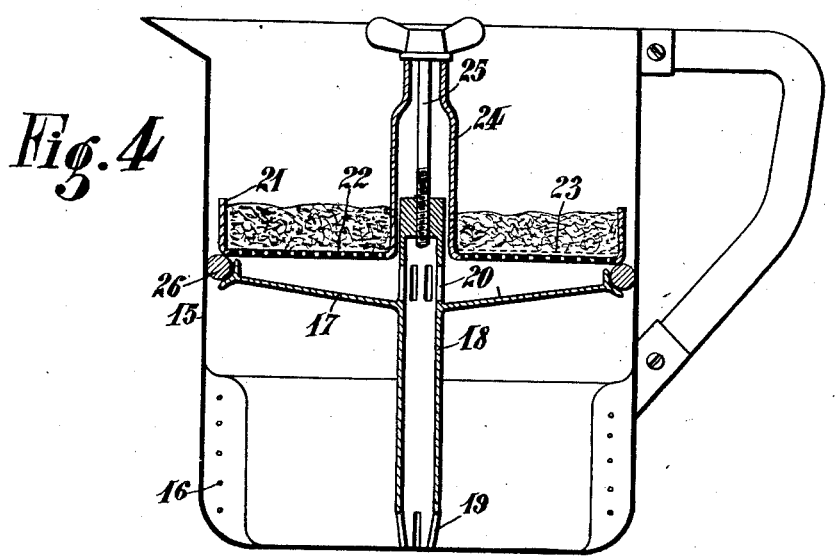
Fig. 4 is a section similar to that of Fig. 1, of another embodiment of the invention.

Fig. 4 shows an example of embodiment in which the coffee is made in any receptacle, without it being necessary to use, as in the preceding case, two receptacles specially provided for that purpose one above, the other below the filter proper. In the example of Fig. 4, it has even been assumed that the receptacle 15 is adapted to be heated electrically by means of an electric resistance 16 placed at the bottom within the wall. It will of course be understood that this means of heating is only given by way of example and that said receptacle may be heated on the fire as in the preceding case.

In this example, the base of the filter 17 is soldered to a tube 18 perforated at its lower end as at 19 and simply resting on the bottom of the receptacle without being screwed thereto. Said tube is also perforated as at 20 above the point of attachment thereto of the base 17. The filter proper is constituted by a kind of circular bowl 21 the bottom 22 of which is perforated and on which is also placed, as in the preceding case, a fine fabric or metal gauze 23. Above said gauze is also placed the coffee powder. Said circular bowl 21 fits over the tube 20, as previously stated; integral with the centre thereof is an extension 24 on the end of which rests the winged head of a screw-threaded rod 25 which screws into the tube 18 at the upper part of the latter. The base 17 has fork-shaped edges wherein is located a plastic joint 26.

The filter 21 being placed above the base 17 and the rod 25 screwed slightly into the rod 18, the whole is placed in the receptacle and the rod 25 is tightly screwed up. By thus screwing up the rod 25, the plate 22 crushes the plastic joint 26 against the wall of the receptacle 15, the base 17, if necessary, flexing slightly in the process.

The device then operates as the one just described: the water contained in the lower part of the receptacle 15, rises up through the central tube under the action of the heat, and passing through the holes 19 and 20, raises and moistens the coffee placed on the filter 22, the remainder of the operation being similar to that described above. The operation may be repeated several times in similar fashion. When the operation is completed, the screw 25 is slightly loosened, thus disengaging the joint 26, the filter and the plate are removed and the coffee made remains in the receptacle 15. Once used and rinsed out, nothing points to its having served as a coffee-pot and it may be used for any other purpose.

In Figs. 5 and 6, other methods of fixing the filter on the receptacle have been shown. In the case of Fig. 5, the filter is fixed on the receptacle by means of a bayonet joint. The flange 7 of the device of Fig. 1 has two pins 27 which fit in a known manner in slots 28 at right angles in the upper part of the receptacle 1.

By pressing on the filter to push the pins 27 into the slots 28, the plastic joint 9 is crushed against the ledge 2 of the receptacle 1.

In the case of Fig. 6, the receptacle 1, has a stirrup 29, provided with a screw 30. Once the upper part 8 of the filter is placed in position, the stirrup is raised over it and the screw 30 tightened on the lid 31. This causes the tight joint to be crushed as previously.

The coffee-pot shown in Figs. 7 and 8 is such that its various component parts after having been dismounted may be fitted one within the other, so as to occupy a reduced volume and facilitate transport.

The filter includes, as in the case of Fig. 1, a perforated sheet metal plate 3 covered with a gauze 4. Said plate screws on to a screw 32 carried by the tube 33, which is itself screwed into the base 34, it being possible to perform these two operations simultaneously. Said tube 33 has also at its lower end a screw 35 which screws into a projection 36 fixed in the base of the receptacle 1. The tube 33 is apertured as at 37 and 38 to enable the water to rise in the manner described. By screwing the screw 35 into 36 the joint 9 is crushed against an edge 39 soldered on to the receptacle 1. The apparatus is completed by a spirit lamp 40 surrounded by a heating stand 41.

For travelling, the various parts are placed one within the other, as may be seen in Fig. 8. The receptacle 1 contains the upper part 8 of the filter which is inverted to place it therein, then the heating stand 41 and finally in the centre the lamp 40, on which the tube 33 is laid horizontally. It will moreover be noted that the latter parts are housed in 1 before placing the member 8 therein since the base 34 which is fixed thereto must fit over said parts. Finally the lid 42 is placed over the whole, the edges of said lid being wide enough to fit over the receptacle 1 as well as over 8.

The receptacle 1 is moreover provided with a handle 43 which can be folded back against the receptacle. The coffee-pot just described operates in exactly the same manner as those described previously.

I claim:

1. In a receptacle for making coffee, the combination of a container, a removable filter removably mounted in said container intermediate the ends thereof, a plastic joint mounted in said container to prevent passage of liquid from one part of said container to the other save through said filter, a tube located in the lower portion of said container and including openings to permit the liquid to enter and rise up said tube and issue therefrom to pass through said filter, said tube having an extension adapted to bear on said plastic joint, a screw-threaded rod secured to said filter and extending through said tube to screw into a fixed projection of said container, and means for connecting said rod to said tube whereby the latter is caused to descend, consequent to the screwing of said rod, and thereby crush said plastic joint against the wall of said container.

2. In a receptacle for making coffee, the combination of a container, a removable filter removably mounted in said container intermediate the ends thereof, a plastic joint mounted in said container to prevent passage of liquid from one part of said container to the other save through said filter, a tube located in the lower portion of said container and including openings to permit the liquid to enter and rise up said tube and issue therefrom to pass through said filter, said tube having an extension adapted to hold said plastic joint against the wall of said container, and cooperating means associated with said filter and tube respectively for moving said filter relatively to said tube whereby said filter is adapted to crush said plastic joint against the wall of said container.

GIUSEPPE SACCO ALBANESÉ.